United States Patent
Hiraide

(10) Patent No.: US 9,046,687 B2
(45) Date of Patent: Jun. 2, 2015

(54) VIRTUAL IMAGE DISPLAY APPARATUS

(71) Applicant: Seiko Epson Corporation, Tokyo (JP)

(72) Inventor: Noriaki Hiraide, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/069,895

(22) Filed: Nov. 1, 2013

(65) Prior Publication Data

US 2014/0139927 A1 May 22, 2014

(30) Foreign Application Priority Data

Nov. 5, 2012 (JP) ................................ 2012-243336

(51) Int. Cl.
*G02B 27/14* (2006.01)
*G02B 27/01* (2006.01)

(52) U.S. Cl.
CPC ........ *G02B 27/0176* (2013.01); *G02B 27/0172* (2013.01); *G02B 2027/0178* (2013.01)

(58) Field of Classification Search
CPC ............. G02B 27/017; G02B 27/0178; G02B 27/0093
USPC .............................. 359/13, 630, 632; 345/7–9
See application file for complete search history.

(56) References Cited

U.S. PATENT DOCUMENTS

| 2010/0157433 | A1 | 6/2010 | Mukawa et al. |
| 2010/0321409 | A1* | 12/2010 | Komori et al. ................ 345/656 |
| 2013/0314303 | A1* | 11/2013 | Osterhout et al. ................ 345/8 |

FOREIGN PATENT DOCUMENTS

JP 2010-145859 A 7/2010

\* cited by examiner

*Primary Examiner* — Mahidere Sahle
(74) *Attorney, Agent, or Firm* — ALG Intellectual Property, LLC

(57) ABSTRACT

A light guide section is directly fixed to a frame via an attachment portion that is part of a peripheral portion of the light guide section, whereby not only can the light guide section be readily fixed and the weight of a virtual image display apparatus can be readily reduced but also the strength at which the frame supports the light guide section is improved. Further, except the attachment portion, the remaining peripheral portion of the light guide section is not fixed to the frame. Therefore, when the light guide section and the frame differ from each other in terms of the coefficient of thermal expansion, the light guide section is allowed to expand with respect to the frame, whereby no distortion, deformation, or breakage of the light guide section will occur.

23 Claims, 10 Drawing Sheets

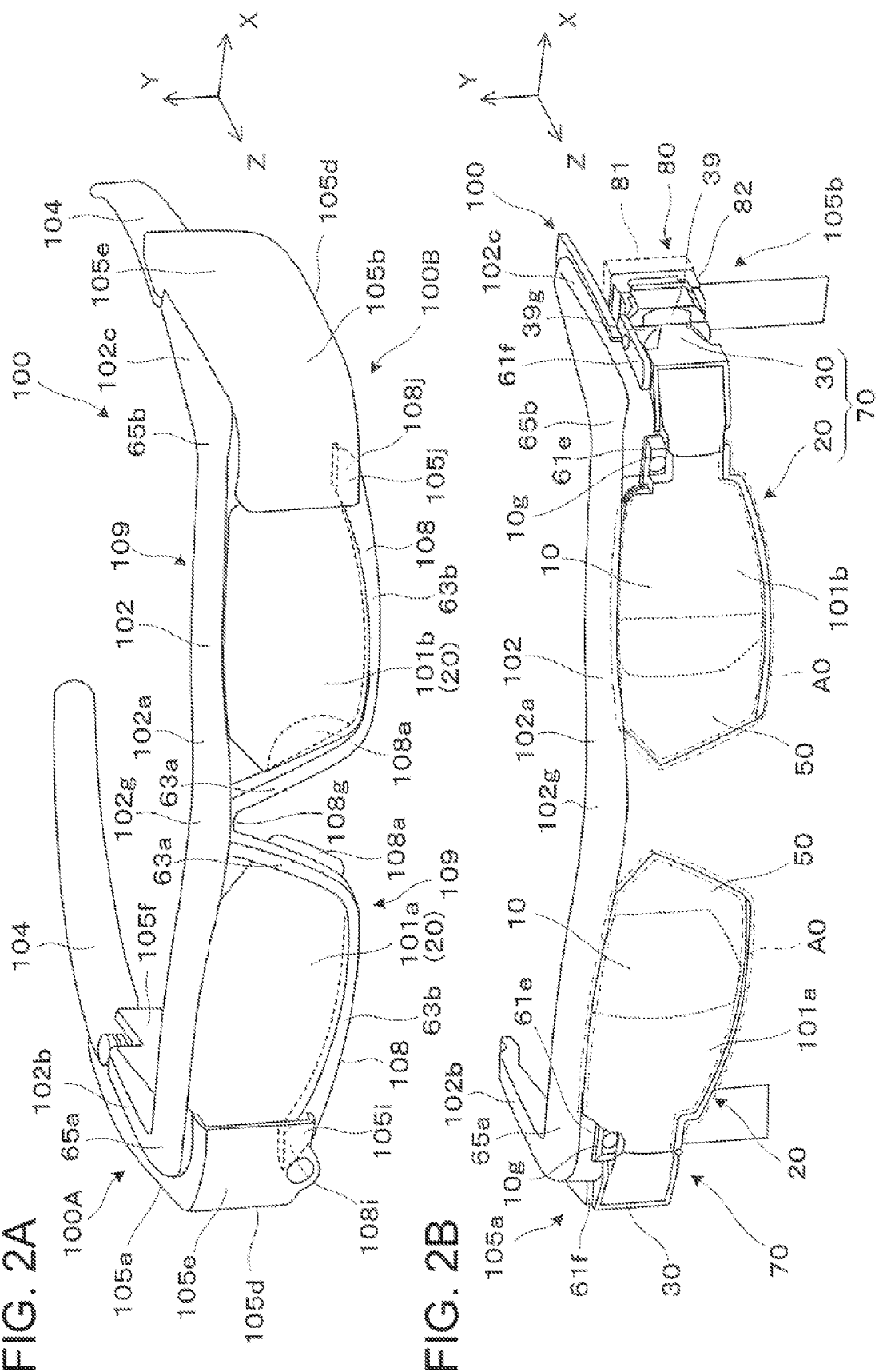

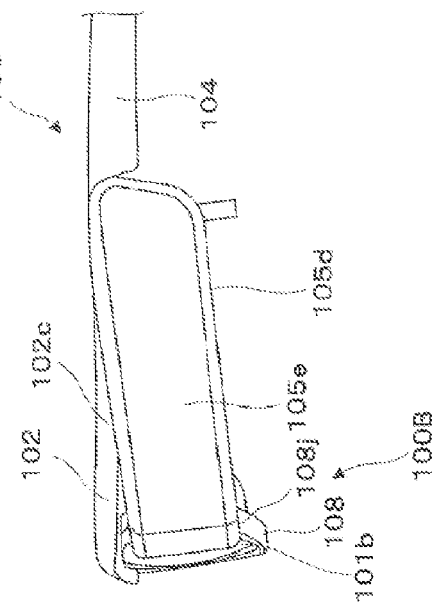
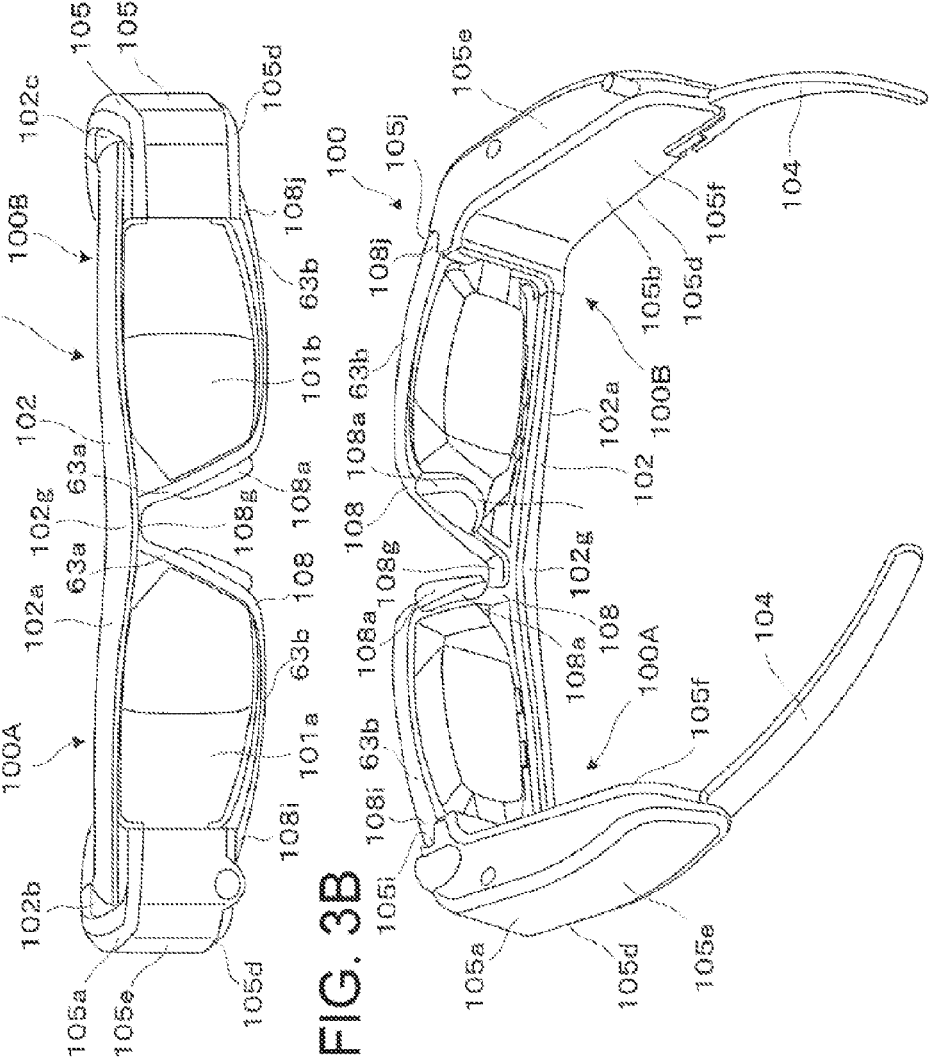
FIG. 3A
FIG. 3B
FIG. 3C

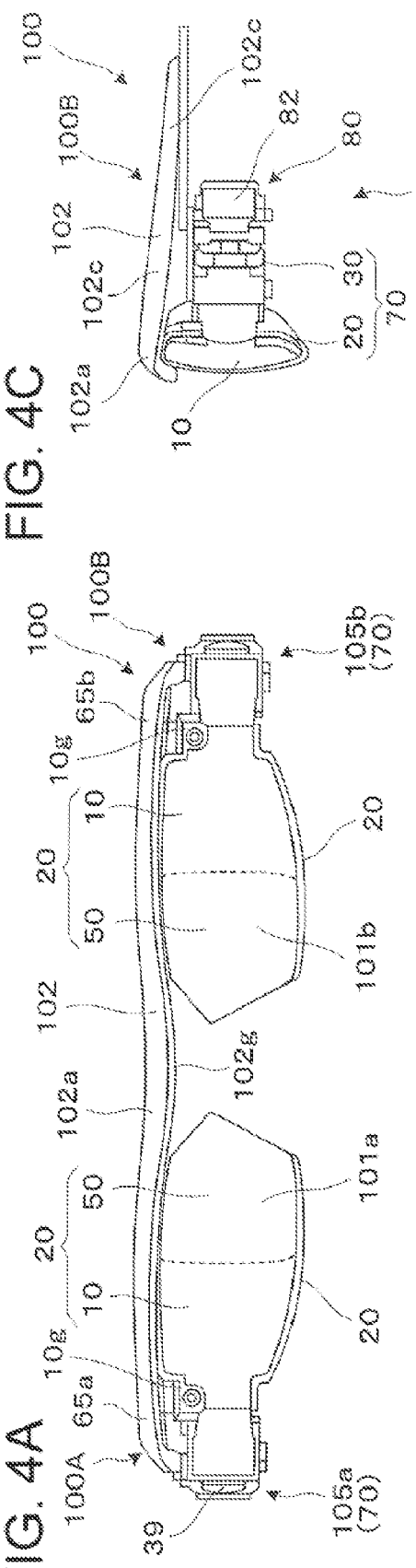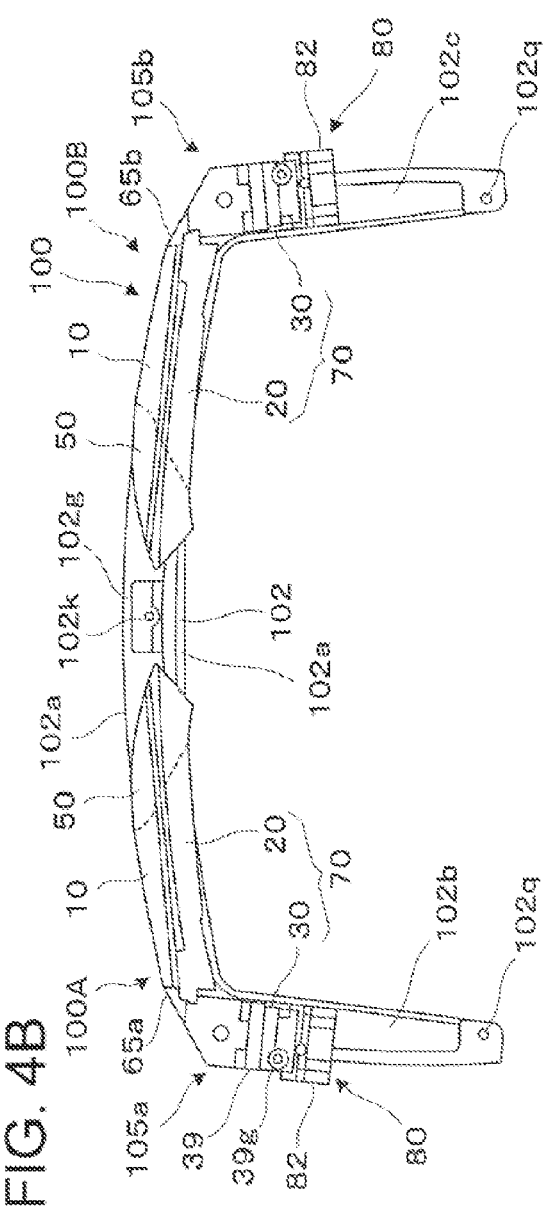

VIRTUAL IMAGE DISPLAY APPARATUS

BACKGROUND

1. Technical Field

The present invention relates to a virtual image display apparatus that presents a viewer with video images in the form of virtual images, and particularly to a virtual image display apparatus suitable for a head-mounted display worn around the head of the viewer.

2. Related Art

A variety of optical systems incorporated in a virtual image display apparatus, such as a head-mounted display (hereinafter also referred to as HMD) worn around the head of a viewer, have been proposed (see JP-A-2011-2753 and JP-A-2010-145859, for example).

A virtual image display apparatus, such as an HMD, is desired to achieve further size and weight reduction and an increase in the angle of view without degradation in image quality. Further, when the entire view of the viewer is covered and only video image light is visible to the viewer, the viewer is unable to know what is going on outside and hence feels anxious. Instead, when the viewer is allowed to see the outside superimposed with video images, a new application, such as virtual reality, is created. It is therefore desired to develop a display that does not obstruct the outside view but displays it with video image light superimposed thereon. Further, to improve comfort and appearance of the viewer who wears the virtual image display apparatus, it is typically desirable that the shape of the apparatus is similar to that of glasses.

In view of the circumstances described above, it is conceivable to configure a virtual image display apparatus based, for example, on a light guide section so disposed in front of the viewer's eyes that see-through observation is achieved and guide video image light from an image display device to the viewer's eyes via the see-through-type light guide section. In a virtual image display apparatus of this type, in which it is necessary to support the light guide section in front of the eyes, for example, a pair of image display units each including an image light generator and a light guide plate are fixed to a connection member, which is fixed to the rear of a frame similar to a frame of glasses (see JP-A-2011-2753).

In the virtual image display apparatus described, for example, in JP-A-2011-2753, however, since the connection member is provided separately from the frame and supports the image display units, the structure is complicated. Further, increasing the strength at which the connection member supports the image display units tends to increase the weight of the apparatus, whereas reducing the weight of the connection member and other components tends to lower the strength at which the image display units are supported.

SUMMARY

An advantage of some aspects of the invention is to provide a virtual image display apparatus capable of improving the strength at which an image display device is supported with the weight of the apparatus reduced.

A first virtual image display apparatus according to an aspect of the invention is a virtual image display apparatus that allows a viewer to visually recognize video images in the form of virtual images, the apparatus including a video image device, an optical member that directs light from the video image device toward a viewer's eye to allow the viewer to visually recognize an image, and a frame that supports the video image device and the optical member in such a way that the optical member is disposed in front of the viewer's eye, wherein the optical member is directly fixed to the frame via an attachment portion that is part of a peripheral portion of the optical member, and the peripheral portion except the attachment portion is not fixed to the frame. That is, the optical member is supported in the form of a cantilever or supported based on local fastening or any other fixing method.

In the first virtual image display apparatus described above, since the optical member is directly fixed to the frame via the attachment portion, which is part of the peripheral portion of the optical member, not only can the optical member be readily fixed and the size and weight of the apparatus can be readily reduced because the number of fastening portions and other parts decreases but also the strength at which the frame supports the optical member is improved. Further, the peripheral portion of the optical member except the attachment portion is not fixed to the frame. Therefore, when the optical member and the frame differ from each other in terms of the coefficient of thermal expansion, the optical member is allowed to expand with respect to the frame, whereby no distortion, deformation, or breakage of the optical member will occur.

In a specific aspect of the invention, in the first virtual image display apparatus described above, the optical member reflects video images from the video image device and guides the video images to the viewer's eye.

In another specific aspect of the invention, the optical member has a prism-shaped light guide section that guides video image light from a video image display device that is the video image device to the viewer's eye while internally reflecting the video image light. In this case, the light guide section tends to be relatively heavy, but directly fixing the light guide section to the frame by using the attachment portion allows the light guide section to be precisely positioned without degradation of optical characteristics of the light guide section.

In another aspect of the invention, the attachment portion is disposed at a light-incident-side portion of the light guide section. In this case, a portion of the light guide section that is close to the video image display device is fixed to the frame, whereby the video image display device and the light guide section are readily aligned with each other. Further, a light-exiting-side portion of the light guide section has no component attached thereto and no fixing mechanism is provided around the viewer's eye, whereby no part that blocks the vision of the viewer is disposed and the apparatus has increased flexibility of exterior appearance.

In another aspect of the invention, the attachment portion is fixed to a sideways portion of the frame. In this case, the light guide section is supported laterally in the form of a cantilever, and the video image display device is attached to a portion around the sideways portion of the frame.

In another aspect of the invention, the frame has a first fixing portion that fixes an image formation main body portion including the video image display device and a second fixing portion that fixes the light guide section. In this case, the image formation main body portion and the light guide section can be separately assembled to the frame, whereby workability of the assembly can be increased.

In another aspect of the invention, the image formation main body portion is fixed to the first fixing portion with a screw, and the light guide section is fixed to the second fixing portion with a screw. In this case, the strength at which the image formation main body portion and the light guide section are attached to the frame can be improved without sacrifice of the assembly workability.

In another aspect of the invention, the image formation main body portion has an engaging member that engages with the light guide section when the engaging member comes into contact with the light guide section. In this case, the image formation main body portion and the light guide section can be precisely aligned with each other with the workability of separately assembling the image formation main body portion and the light guide section to the frame ensured, whereby errors and other factors in processes of manufacturing the frame are readily handled, which contributes to improvement in the performance of the virtual image display apparatus.

In another aspect of the invention, the image formation main body portion includes a projection lens that focuses the video image light from the video image display device in the light guide section. In this case, an intermediate image formed in the light guide section allows observation of the video images, whereby the video image display device and other components can be disposed with increased flexibility without the video image display device and the other components enlarged.

In another aspect of the invention, the image formation main body portion includes a cover-shaped exterior member fixed to the frame. In this case, the internal structure of the image formation main body portion can be protected and generation of stray light can be suppressed at the same time.

In another aspect of the invention, the light guide section includes a prism that guides the video image light and allows see-through observation of outside light and a light transmissive member that is connected to the prism and assists the outside light see-through observation capability of the prism. In this case, the shape or the state of the light guide section can be similar to the shape or the state of a lens portion of glasses, whereby the apparatus provides satisfactory vision and has increased flexibility of exterior appearance.

In another aspect of the invention, the video image device outputs signal light which forms two-dimensional scan light, and the optical member reflects the light from the video image device and guides the light to the viewer's eye.

In another aspect of the invention, the frame has a limiting portion that limits displacement of the optical member in a predetermined direction. In this case, undesirable displacement of the optical member can be suppressed, whereby no deformation, distortion, breakage, or any other damage of the optical member will occur.

In another aspect of the invention, the limiting portion limits displacement of the optical member in a depth direction of the frame.

In another aspect of the invention, the virtual image display apparatus further includes a protector that is fixed to the frame and protects at least part of the peripheral portion of the optical member except the attachment portion. In this case, the frame and the protector can surround and protect the peripheral portion of the optical member, whereby the virtual image display apparatus has improved durability against a strong impact produced, for example, when the virtual image display apparatus accidentally falls and acting in an arbitrary direction.

In another aspect of the invention, each of the frame and the protector is formed of a metal material. In this case, the frame and the protector can be of high precision and high rigidity, whereby the video image display device and the optical member can be more reliably assembled to the frame and the protector.

In another aspect of the invention, the frame fixes and supports a pair of video image devices and a pair of optical members symmetrically in the sideways direction. In this case, the virtual image display apparatus can be similar to glasses, whereby both eyes can be provided with the same or different video images.

A second virtual image display apparatus according to another aspect of the invention is a virtual image display apparatus that allows a viewer to visually recognize video images in the form of virtual images, the apparatus including a video image device, an optical member that directs light from the video image device toward a viewer's eye to allow the viewer to visually recognize an image, a frame that supports the video image device and the optical member in such a way that the optical member is disposed in front of the viewer's eye, and a protector that is fixed to the frame and covers and protects at least part of a peripheral portion of the optical member except an attachment portion fixed to the frame.

In the second virtual image display apparatus described above, the protector covers and protects at least part of a peripheral portion of the optical member except an attachment portion fixed to the frame. That is, the frame and the protector can surround, cover and protect the peripheral portion of the optical member, whereby the virtual image display apparatus has improved durability against a strong impact produced, for example, when the virtual image display apparatus accidentally falls and acting in an arbitrary direction.

In a specific aspect of the invention, in the second virtual image display apparatus described above, the optical member has a prism-shaped light guide section that guides video image light from a video image display device that is the video image device to the viewer's eye while internally reflecting the video image light.

In another specific aspect of the invention, the optical member is not fixed to the protector. In this case, when the optical member, the protector, and other components differ from each other in terms of the coefficient of thermal expansion, the optical member is allowed to expand, whereby no deformation, distortion, breakage, or any other damage of the optical member will occur.

In another aspect of the invention, the protector is a frame-shaped, elongated member. In this case, the protector can be lightweight and disposed as if it were part of a frame of glasses in the exterior appearance, whereby the apparatus can be naturally designed.

In another specific aspect of the invention, the protector is directly or indirectly fixed to a central portion and sideways portions of the frame. In this case, the protector can be fixed to and integrated with the frame in a simple manner.

BRIEF DESCRIPTION OF THE DRAWINGS

The invention will be described with reference to the accompanying drawings, wherein like numbers reference like elements.

FIG. 2A is a perspective view showing the entire virtual image display apparatus, and FIG. 2B is a perspective view showing the internal structure with an exterior member and a protector removed from the virtual image display apparatus.

FIGS. 3A to 3C are a front view, a rear-side perspective view, and a side view of the virtual image display apparatus according to the embodiment.

FIGS. 4A to 4C are a front view, a rear view, and a side view of the virtual image display apparatus with the internal structure thereof visible.

DESCRIPTION OF EXEMPLARY EMBODIMENTS

First Embodiment

A virtual image display apparatus according to a first embodiment of the invention will be described below in detail with reference to FIG. 1 and other figures.

Figure 1:
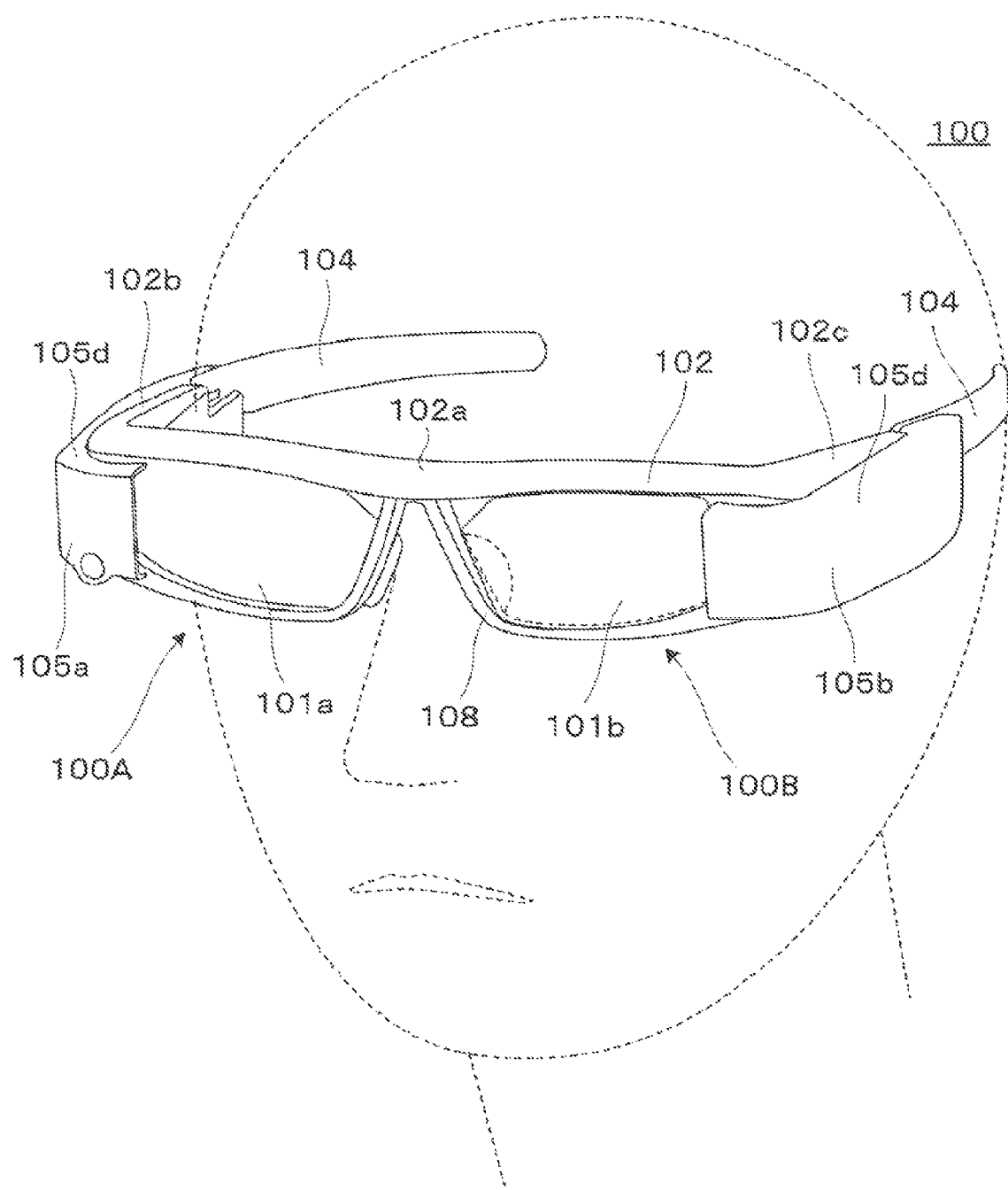
FIG. 1 is a perspective view for describing the external appearance of a virtual image display apparatus according to a first embodiment of the invention.

A virtual image display apparatus 100 according to the present embodiment is a head-mounted display having a glasses-like exterior appearance as shown in FIG. 1 and allows a viewer or a user who wears the virtual image display apparatus 100 not only to visually recognize image light in the form of a virtual image but also to experience see-through visual recognition or observation of an image formed by outside light. The virtual image display apparatus 100 includes first and second optical members 101a, 101b, which cover areas in front of the viewer's eyes in such a way that the optical members allow see-through observation, a frame 102, which supports the optical members 101a and 101b, and first and second image formation main body portions 105a, 105b, which are added to portions extending rearward from the right and left ends of the frame 102 to sidepiece portions (temples) 104. A first display unit 100A, which is a combination of the first optical member 101a and the first image formation main body portion 105a on the left side in FIG. 1, is a portion that forms a virtual image for the right eye and functions by itself as a virtual image display apparatus. Similarly, a second display unit 100B, which is a combination of the second optical member 101b and the second image formation main body portion 105b on the right side in FIG. 1, is a portion that forms a virtual image for the left eye and functions by itself as a virtual image display apparatus.

Figure 5:
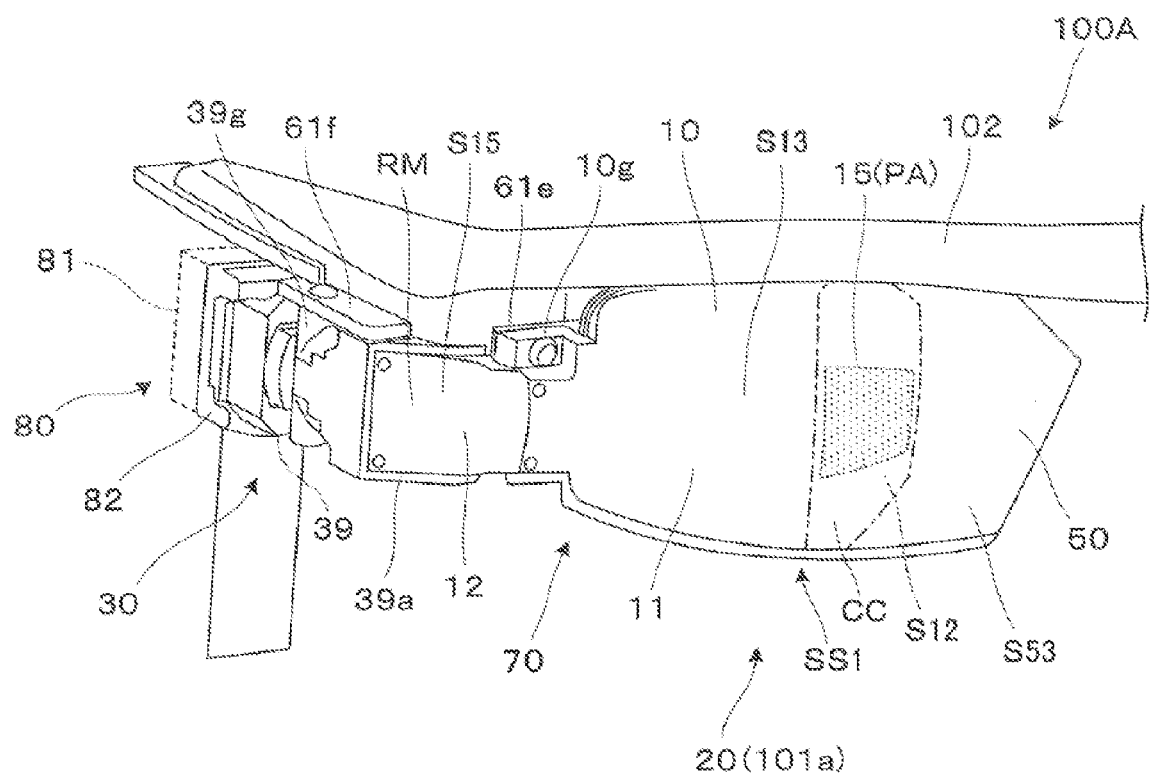
FIG. 5 is a perspective view showing a state in which an exterior member and other components are removed in order to describe the structure of a first display unit of the virtual image display apparatus.

FIGS. 2A and 2B compare the exterior appearance and the internal structure of the virtual image display apparatus 100. FIG. 2A shows the entire virtual image display apparatus 100, and FIG. 2B shows the internal structure of the virtual image display apparatus 100. FIGS. 3A to 3C correspond to FIG. 2A and are a front view, a rear-side perspective view, and a side view of the external appearance of the virtual image display apparatus 100. FIGS. 4A to 4C correspond to FIG. 2B and are a front view, a rear view, and a side view of the internal structure of the virtual image display apparatus 100. FIG. 5 corresponds to the left half of the structure shown in FIG. 2B and is a partially enlarged perspective view of the first display unit 100A of the virtual image display apparatus 100.

The frame 102 provided in the virtual image display apparatus 100 is an elongated plate-shaped member having a U-like-bent shape and includes a front portion 102a extending rightward and leftward in the lateral direction (X direction) and a pair of side portions 102b and 102c extending forward and rearward in the depth direction (Z direction), as shown in FIG. 1 and other figures. The frame 102, which is formed of the front portion 102a and the side portions 102b and 102c, is a metal integrated part made of aluminum or any other suitable metal material and formed in a die-cast process. The width of the front portion 102a in the depth direction (Z direction) is sufficiently greater than the thickness or width of a light guide section 20 corresponding to each of the first and second optical members 101a, 101b. The first optical member 101a and the first image formation main body portion 105a, which are aligned with each other, are directly fixed to and supported by a left sideways portion of the frame 102, specifically, a sideways end portion 65a, which is a portion extending from the left end of the front portion 102a in a front view to the side portion 102b, with screws. Similarly, the second optical member 101b and the second image formation main body portion 105b, which are aligned with each other, are directly fixed to and supported by a right sideways portion of the frame 102, specifically, a sideways end portion 65b, which is a portion extending from the right end of the front portion 102a in a front view to the side portion 102c, with screws. It is noted that the first optical member 101a and the first image formation main body portion 105a are aligned with each other based on fitting connection, and that the second optical member 101b and the second image formation main body portion 105b are aligned with each other based on fitting connection.

A protector 108 is fixed as an under-rim-shaped member or a frame-shaped member to the frame 102. A central portion 108g of the protector 108 is fixed to a central portion 102g of the frame 102 based on fitting and screwing connection. To this end, a recess 102k for fixing purposes is formed in the central portion 102g of the frame 102, and a threaded hole is formed at the center of the recess 102k, as shown in FIG. 4B. The protector 108 is not only an elongated plate-shaped member having a two-step-crank-like bent shape but also an integrated part made of a metal or resin material. The width of the protector 108 in the depth direction (Z direction) is comparable with the thickness or width of the light guide section 20 corresponding to each of the first and second optical members 101a, 101b. A first end portion 108i of the protector 108 is fixed to the first image formation main body portion 105a based on fitting connection, and a second end portion 108j of the protector 108 is fixed to the second image formation main body portion 105b based on fitting connection. More specifically, the first end portion 108i of the protector 108 is fit into and fixed to a recess 105i provided in an outer member 105e of a cover-shaped exterior member 105d, which covers the first image formation main body 105a. Similarly, the second end portion 108j of the protector 108 is fit into and fixed to a recess 105j provided in another outer member 105e of another cover-shaped exterior member 105d, which covers the second image formation main body 105b.

The frame 102 has a role not only in supporting the first and second image formation main body portions 105a, 105b but also, in cooperation with the exterior members 105d, in protecting the interior of the first and second image formation main body portions 105a, 105b. The protector 108 has a role in protecting the side edges and the lower edge of each of the first and second optical members 101a, 101b or the light guide sections 20 connected to the first and second image formation main body portions 105a, 105b. Specifically, each vertical portion 63a of the protector 108 protects the inner side edge of a peripheral portion A0 of the corresponding light guide section 20 from a variety of surrounding objects present in an environment in which the apparatus is used, and each horizontal portion 63b of the protector 108 protects the lower edge of the peripheral portion A0 of the corresponding light guide section 20 from the variety of surrounding objects present in the environment in which the apparatus is used. That is, even when the virtual image display apparatus 100 hits against or otherwise interacts with an object therearound, the possibility of damage and positional shift of the first and second image formation main body portions 105a, 105b and the first and second optical members 101a, 101b, particularly, the exposed light guide sections 20 can be reduced as long as the frame 102 and the protector 108 have sufficient strength.

Nose pad members 108a are formed on the pair of vertical portions 63a in the vicinity of the central portion 108g of the protector 108. The vertical portions 63a and the horizontal portions 63b of the protector 108 are separate from or weakly in contact with the peripheral portions A0 of the light guide sections 20, unlike root portions thereof connected to the first and second image formation main body portions 105a, 105b. The peripheral portions A0 of the light guide sections 20 are also separate from or weakly in contact with the front portion 102a of the frame 102. As described above, the light guide sections 20, specifically, the C-shaped peripheral portions A0 except the root portions are placed in the vicinity of the frame 102 and the protector 108 but are not fixed to the frame 102 or the protector 108. Therefore, when the central light guide sections 20 and a frame-shaped member 109, which includes the frame 102 and the protector 108, differ from each other in terms of the coefficient of thermal expansion, the light guide sections 20 are allowed to expand in the frame-shaped member 109, whereby no distortion, deformation, or breakage of the light guide sections 20 will occur.

The first display unit 100A includes, from a different point of view, a projection and see-through device 70, which is a projection system, and an image display device 80, which forms video image light, as shown in FIGS. 4B, 5, and other figures. The projection and see-through device 70 has a role in projecting an image formed by the first image formation main body portion 105a in the form of a virtual image onto the viewer's eye. The projection and see-through device 70 includes a prism 10 for light guiding and see-through observation, a light transmissive member 50 for see-through observation, and a projection lens 30 for image formation.

Figure 6A:
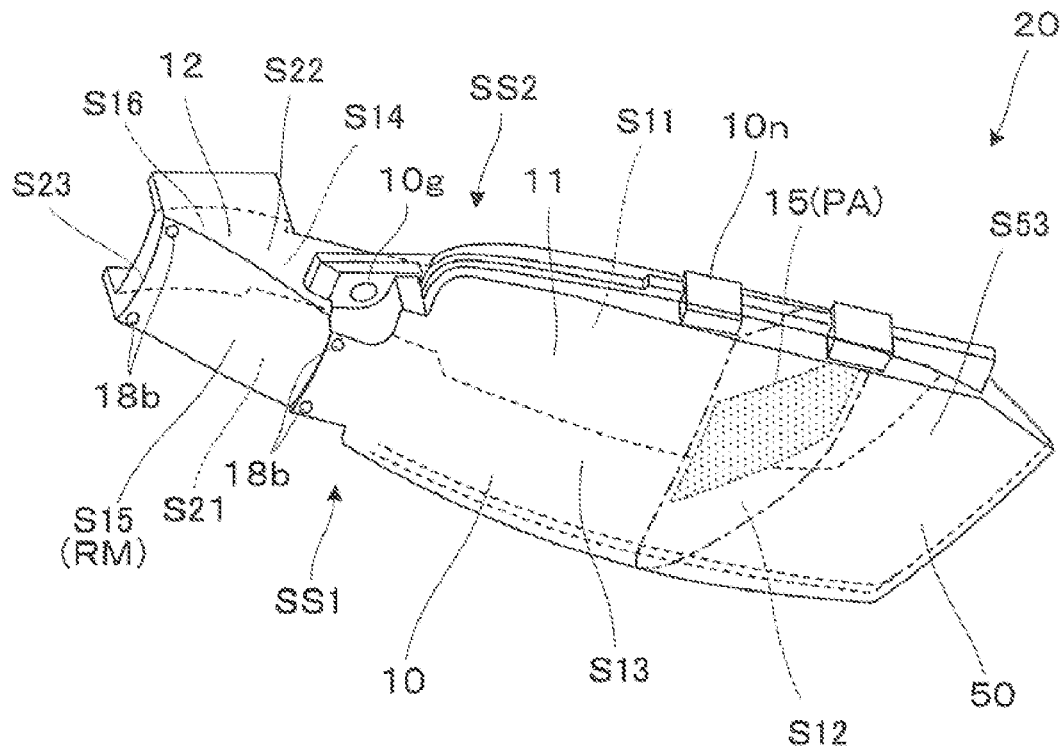
FIGS. 6A and 6B are perspective views for describing the external appearance of a light guide section or an optical member incorporated in the first display unit.
Figure 6B:
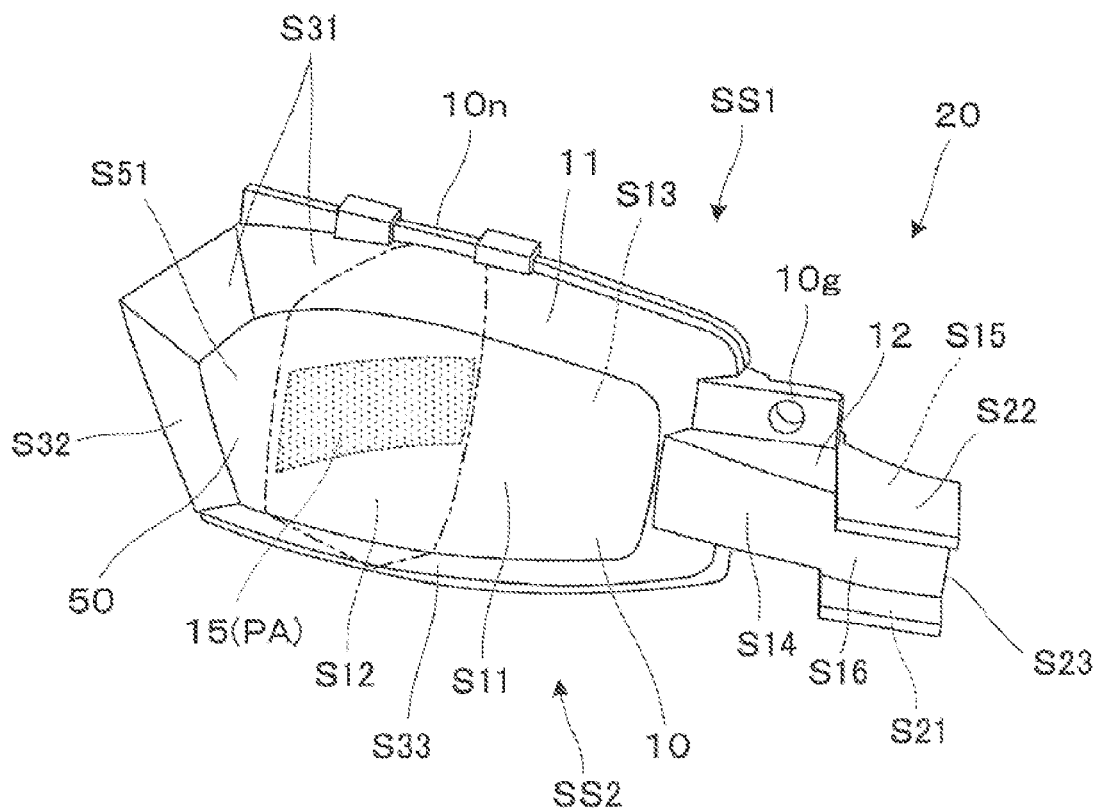

The prism 10 and the light transmissive member 50 are fixed to each other to form the integrated light guide section 20, as shown in FIGS. 6A and 6B. The light transmissive member 50 is attached to an end portion of the prism 10 connected to the projection lens 30, which is an optically upstream component, specifically, to an optically downstream end portion of the prism 10. That is, the light transmissive member 50 is disposed along an extension of an exit-side or light-exiting-side first prism portion 11 and connected and fixed thereto with an adhesive. The light guide section 20, which is part of the projection and see-through device 70 shown in FIG. 5 and other figures and a combination of the prism 10 and the light transmissive member 50, corresponds to the first optical member 101a in FIG. 1, and the projection lens 30 in the projection and see-through device 70 and the image display device 80, which forms an image pattern to be displayed, correspond to the first image formation main body portion 105a in FIG. 1.

A description will be made of the assembly of the first display unit 100A to the frame 102 with reference to FIGS. 7A and 7B and other figures. The projection lens 30, which forms the first image formation main body portion 105a, is directly fixed to a first fixing portion 61f provided at the sideways end portion 65a of the frame 102 by using an attachment portion 39g so formed that it is embedded in a lens barrel 39 of the projection lens 30. In the fixing process, a rear surface 68f of the first fixing portion 61f, an upper end surface 39f of the attachment portion 39g, and other portions come into contact and are aligned with each other, and the projection lens 30 and the frame 102 are detachably and reliably fixed to each other when a screw 61t is screwed into the attachment portion 39g through a screw hole 61s. In this process, a boss 39x provided on the lens barrel 39 fits into a boss hole 61x in the frame 102 to prevent the lens barrel 39 from rotating, whereby the lens barrel 39 is positioned also in the rotational direction. On the other hand, the light guide section 20, which is the first optical member 101a, is directly fixed to a second fixing portion 61e provided on the sideways end portion 65a of the frame 102 by using a protruding attachment portion 10g formed on a neck portion of the light guide section 20. The attachment portion 10g is so configured that it stands and extends outward from an incident-side or light-incident-side portion of the light guide section 20, specifically, the periphery of the boundary between the first prism portion 11 and a second prism portion 12. In the fixing process described above, a rear surface 10k of the attachment portion 10g comes into contact and is aligned with a stopper surface 68e provided on a front portion of the second fixing portion 61e, and the light guide section 20 and the frame 102 can be detachably and reliably fixed to each other when a screw 61v is screwed into a threaded hole 61u through a screw hole 10u. In this process, portions around the rear surface 10k of the attachment portion 10g also come into contact with the second fixing portion 61e, whereby the alignment is made more securely. The image display device 80 shown in FIG. 5 and other figures is fit into and fixed to the rear end of the lens barrel 39 of the projection lens 30.

The light guide section 20 is positioned with respect to and engages with the projection lens 30 when an end portion 12j of the prism 10 on the side where the second prism portion 12 is present is fit into an engaging member 39a provided at the front end of the lens barrel 39 of the projection lens 30 and having a rectangular-frame-like shape with an opening. That is, when the prism 10 provided in the light guide section 20 is fixed to the second fixing portion 61e of the frame 102, the end portion 12j located on the side where the second prism portion 12 is present is so inserted that the end portion 12j fits into the engaging member 39a of the lens barrel 39. In this process, side surfaces 12m of the end portion 12j come into contact and are aligned with inner surfaces 39m of the engaging member 39a.

Figure 7A:
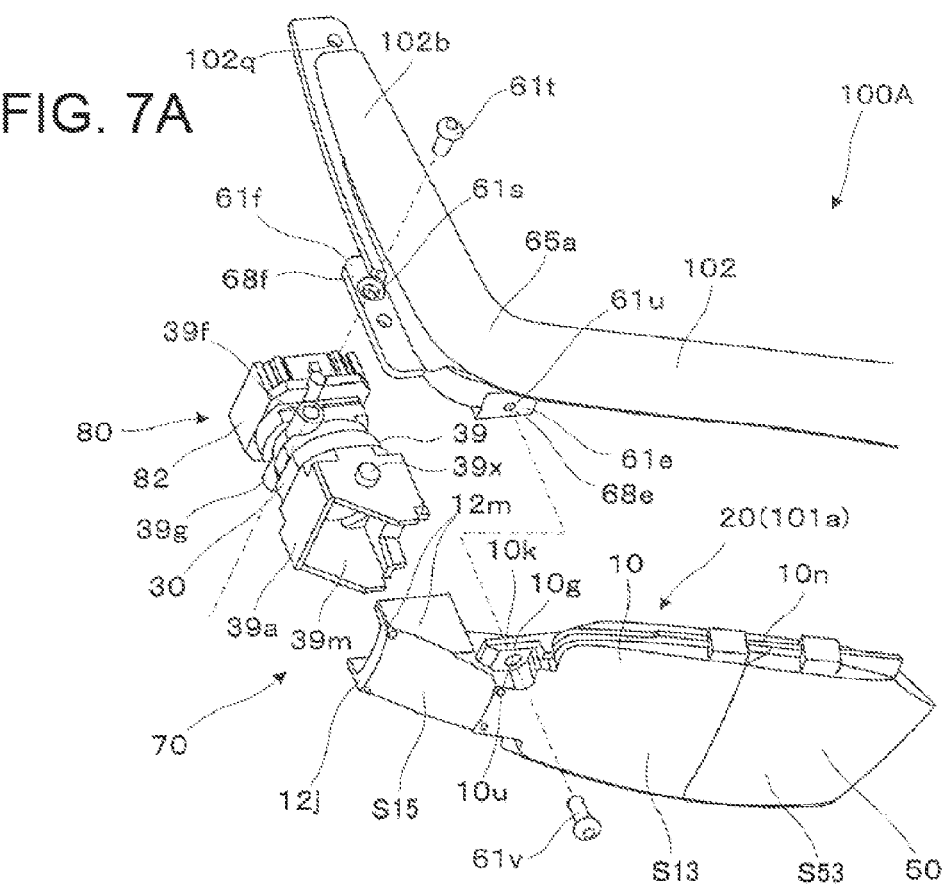
FIGS. 7A and 7B are exploded perspective views for describing how the light guide section and a projection lens of the virtual image display apparatus are fixed to a frame.
Figure 7B:
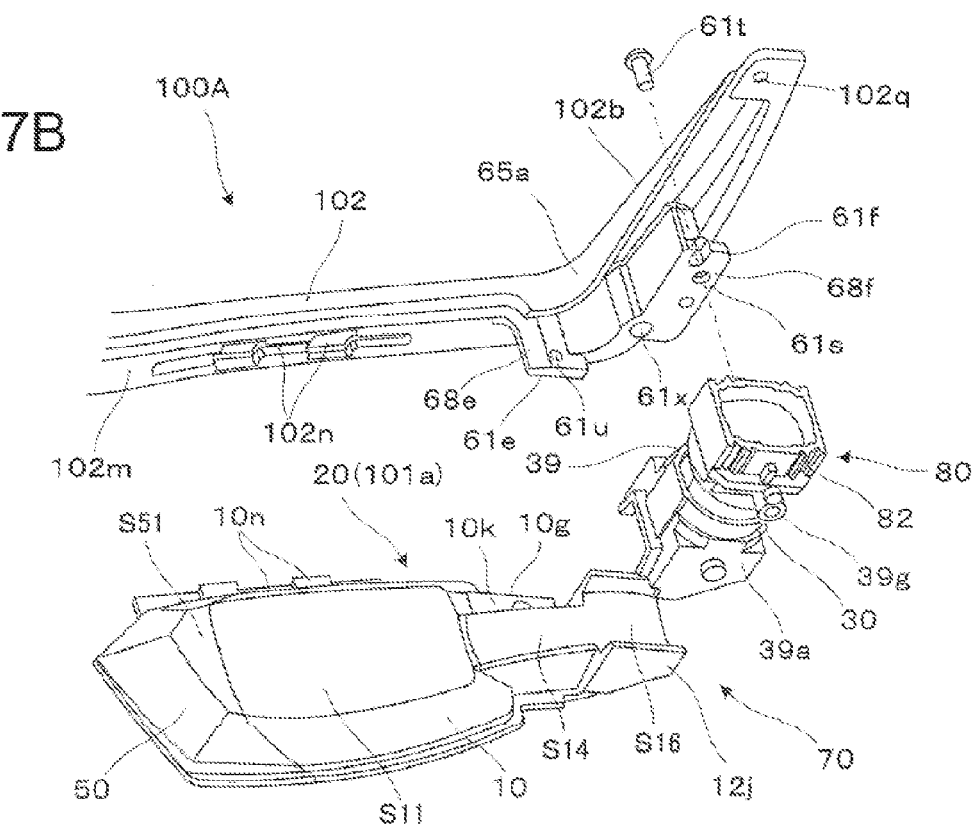

A groove-shaped limiting portion 102n is provided as a stopper in a lower surface 102m of the front portion 102a of the frame 102, as shown in FIG. 7B. After the assembly of the first optical member 101a or the light guide section 20, a protruding rib 10n provided on the upper end of the prism 10 provided in the light guide section 20 is inserted and fit into the limiting portion 102n with a play or a slight gap between the rib 10n and the limiting portion 102n, whereby displacement of an upper end of the first optical member 101a or the light guide section 20 can be limited in the depth direction (Z direction shown in FIG. 2B) of the frame 102. The rib 10n of the light guide section 20 and the limiting portion 102n of the frame 102 extend rightward and leftward in the lateral direction (X direction), and since the rib 10n and the limiting portion 102n are not in close contact with or bonded to each other, the state in which the light guide section 20 is not fixed to the frame 102 is ensured. That is, the light guide section 20 is slightly separate from the protector 108 and is also not fixed to the protector 108. As a result, the light guide section 20 is allowed, for example, to expand with respect to the frame 102 when the light guide section 20 and the frame 102 differ from each other in terms of the coefficient of thermal expansion.

The frame 102 and the projection and see-through device 70 can thus be assembled to each other (see FIG. 2B) by carrying out the steps described above.

A description will be made of assembly of the exterior members 105d to the frame 102 with reference to FIGS. 2A and 2B and other figures. The outer member 105e of each of the exterior members 105d is first fixed to the assembly formed of the frame 102, the projection and see-through device 70, and other components. The outer member 105e is fixed based on fitting connection to the frame 102 and the projection lens 30 and screw or other type of connection to the attachment portion 39g of the projection lens 30. In this process, the end portions 108i and 108j of the protector 108, which has been already fixed to the frame 102, are fit into and fixed to the recesses 105i formed in the outer members 105e. Inner members 105f are then fit into the outer members 105e and fixed thereto with screws. As a result, the projection lens 30, the image display device 80, and other components, which form the first image formation main body portion 105a, the second prism portion 12, which is part of the light guide section 20, and the side portion 102b of the frame 102 are accommodated in the space sandwiched between the corresponding inner member 105f and outer member 105e. That is, the assembly of the first display unit 100A is completed.

The second display unit 100B shown in FIG. 1 has the same structure as that of the first display unit 100A and is simply a horizontally reversed version of the first display unit 100A, and the structure, the function, the assembly, and other features of the second display unit 100B will not therefore be described.

The sidepiece portions 104 are fixed to holes 102q provided in end portions of the pair of side portions 102b and 102c of the frame 102, as shown in FIG. 2A, 7A, and other figures. Portions where the sidepiece portions 104 and the side portions 102b, 102c are connected to each other can have a hinge structure. In this case, the sidepiece portions 104 can be foldable portions.

Figure 8:
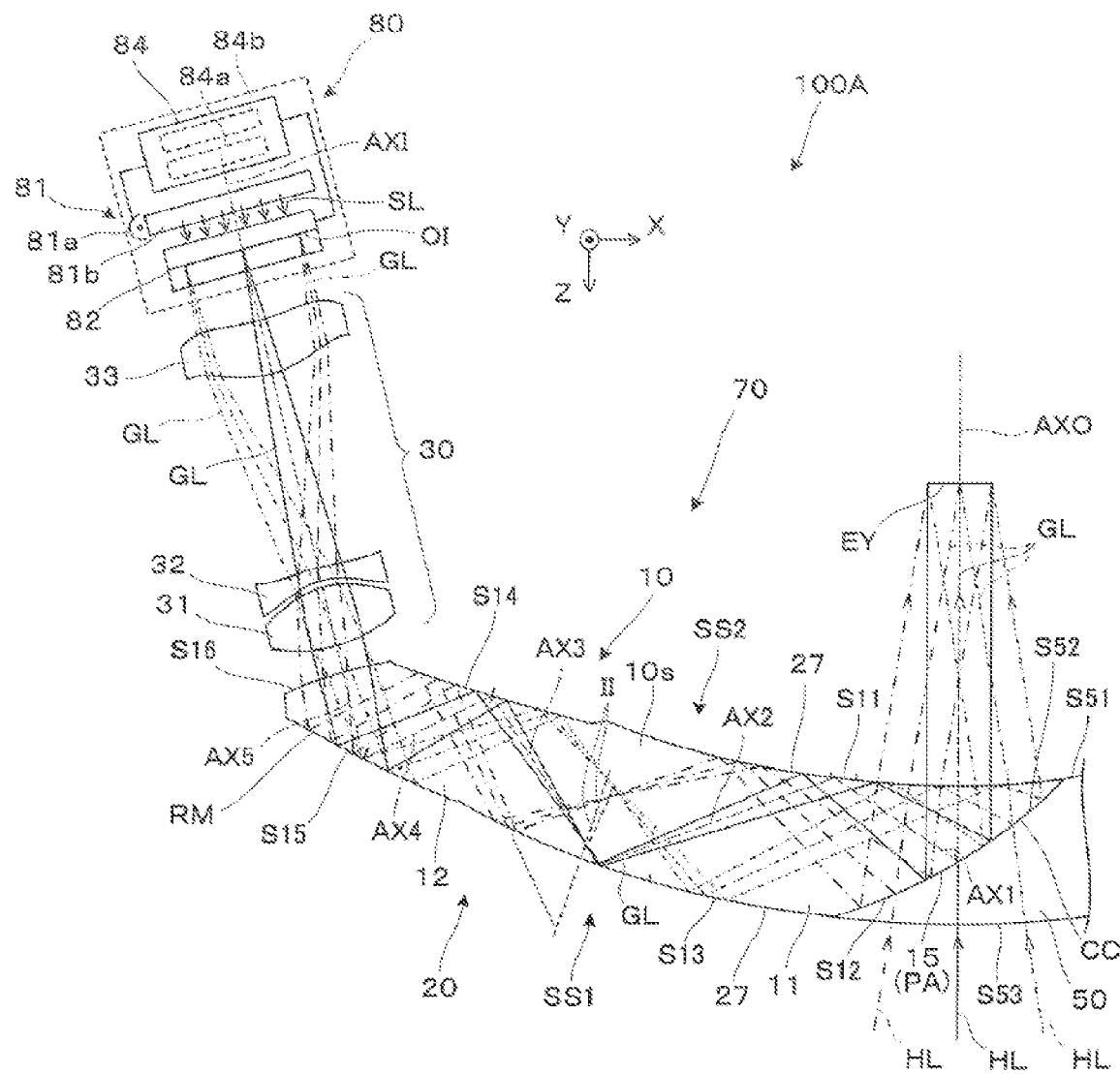
FIG. 8 is a cross-sectional view taken along a plane with respect to which a first display unit that forms the virtual image display apparatus is symmetric in the vertical direction.

A description will be made of the function, operation, and other features of the projection and see-through device 70 and other components, which form each of the display units 100B and 110A, with reference to FIG. 8. In the projection and see-through device 70, the prism 10, which is part of the light guide section 20, is an arcuate member curved along the face of the wearer in a plan view. The first prism portion 11 of the prism 10 is disposed close to the center or the nose of the wearer, that is, on the light exiting side and has a first surface S11, a second surface S12, and a third surface S13 as side surfaces having optical functions, and the second prism portion 12 of the prism 10 is disposed in the periphery away from the nose of the wearer, that is, in the light incident side and has a fourth surface S14, a fifth surface S15, and a sixth surface S16 as side surfaces having optical functions. The surfaces are arranged as follows: The first surface S11 and the fourth surface S14 are adjacent to each other; the third surface S13 and the fifth surface S15 are adjacent to each other; the second surface S12 is disposed between the first surface S11 and the third surface S13; and the sixth surface S16 is disposed between the fourth surface S14 and the fifth surface S15.

The surfaces of the prism 10 are configured as follows: The first surface S11 is a free-form surface formed around a light-exiting-side optical axis AXO parallel to the Z axis; the second surface S12 is a free-form surface formed around an optical axis AX1 present in a reference plane (cross-sectional plane in FIG. 8) parallel to the XZ plane and inclined to the Z axis; the third surface S13 is a free-form surface formed around the light-exiting-side optical axis AXO; the fourth surface S14 is a free-form surface formed around the bisector of a pair of optical axes AX3 and AX4 present in the reference plane described above parallel to the XZ plane and inclined to the Z axis; the fifth surface S15 is a free-form surface formed around the bisector of a pair of optical axes AX4 and AX5 present in the reference plane described above parallel to the XZ plane and inclined to the Z axis; and the sixth surface S16 is a free-form surface formed around the optical axis AX5 present in the reference plane described above parallel to the XZ plane and inclined to the Z axis. Each of the first to sixth surfaces S11 to S16 described above has a shape symmetric in the vertical (upward and downward) Y-axis direction with respect to the reference plane (cross-sectional plane in FIG. 8), which extends horizontally (or rightward and leftward), which is parallel to the XZ plane, and in which the optical axes AX1 to AX5 and other axes extend.

A prism main body 10s of the prism 10 is made of a resin material showing high light transmittance in the visible region and molded, for example, by injecting a thermoplastic resin material into a die and allowing the injected resin to solidify. The material of the prism main body 10s can, for example, be a cycloolefin polymer. Although the prism main body 10s is a unitary molded part, the prism 10 can be functionally divided into the first prism portion 11 and the second prism portion 12 as described above. The first prism portion 11 allows guide and output of video image light GL and see-through observation of outside light HL, and the second prism portion 12 allows reception and guide of the video image light GL.

In the first prism portion 11, the first surface S11 functions not only as a refractive surface through which the video image light GL exits out of the first prism portion 11 but also as a total reflection surface that internally totally reflects the video image light GL. The first surface S11 is disposed in front of an eye EY and has a concave shape toward the viewer. The first surface S11 is one of the surfaces formed by providing a hard coat layer 27 on the prism main body 10s.

The second surface S12 is a surface of the prism main body 10s, and a half-silvered mirror layer 15 is associated with the surface. The half-silvered mirror layer 15 is a reflective film that transmits light (that is, semi-transmissive/semi-reflective film). The half-silvered mirror layer (semi-transmissive/semi-reflective film) 15 is not formed all over the second surface S12 but is formed on a partial area PA, which is an area of the second surface S12 that is primarily narrowed with respect to the vertical direction along the Y axis. The half-silvered mirror layer 15 is formed by forming a metal reflective film or a dielectric multilayer film on the partial area PA of a base surface of the prism main body 10s. The reflectance of the half-silvered mirror layer 15 at which video image light GL is reflected ranges from 10% or higher but 50% or lower over an expected range of the angle of incidence of the video image light GL from the viewpoint of readily allowing see-through observation of outside light HL. The reflectance and transmittance of the half-silvered mirror layer 15 in a specific example at which the video image light GL is reflected and transmitted are set, for example, at 20% and 80%, respectively.

The third surface S13 functions as a total reflection surface that internally totally reflects the video image light GL. The third surface S13 is disposed in front of the eye EY and has a concave shape toward the viewer as the first surface S11 does, and the diopter is substantially zero when the viewer observes outside light HL having passed through the first surface S11 and the third surface S13. The third surface S13 is one of the surfaces formed by providing the hard coat layer 27 on the prism main body 10s.

In the second prism portion 12, the fourth surface S14 functions as a total reflection surface that internally totally reflects the video image light GL. The fourth surface S14 is one of the surfaces formed by providing the hard coat layer 27 on the prism main body 10s.

In the second prism portion 12, the fifth surface S15 is formed by forming a light reflective film RM made of an inorganic material on a surface of the prism main body 10s as described above and functions as a reflection surface.

The sixth surface S16 functions as a refractive surface which allows the video image light GL to enter the second prism portion 12. The sixth surface S16 is one of the surfaces formed by providing the hard coat layer 27 on the prism main body 10s.

The light transmissive member 50 is fixed to and integrated with the prism 10 to form the light guide section 20, which is a single optical part, as described above. The light transmissive member 50 is a member (auxiliary prism) that assists the see-through function of the prism 10 and has a first transmissive surface S51, a second transmissive surface S52, and a third transmissive surface S53 as side surfaces having optical functions. The second transmissive surface S52 is disposed between the first transmissive surface S51 and the third transmissive surface S53. The first transmissive surface S51 is a curved surface that coincides with an extension of the first surface S11 of the prism 10. The second transmissive surface S52 is bonded to and integrated with the second surface S12 via an adhesive layer CC. The third transmissive surface S53 is a curved surface that coincides with an extension of the third surface S13 of the prism 10. The second transmissive surface S52 and the second surface S12 of the prism 10, which are bonded to and integrated with each other via the thin adhesive layer CC, have shapes having substantially the same curvature.

The light transmissive member (auxiliary prism) 50 shows high light transmittance in the visible region, and a main body of the light transmissive member 50 is made of a thermoplastic resin material having a refractive index substantially equal to that of the prism main body 10s of the prism 10. The light transmissive member 50 is formed by bonding the main body thereof to the prism main body 10s of the prism 10 and then forming a hard coat film on the prism main body 10s and the main body of the light transmissive member 50 bonded thereto. That is, the light transmissive member 50 has the hard coat layer 27 provided on the main body thereof, as the prism 10 does. Each of the first transmissive surface S51 and the third transmissive surface S53 is one of the surfaces formed by providing the hard coat layer 27 on the main body of the transmissive member 50.

The image display device 80 includes an illuminator 81, which outputs two-dimensional illumination light SL, a video image display device 82, which is a transmissive spatial light modulator, and a drive controller 84, which controls the operation of the illuminator 81 and the video image display device 82.

The illuminator 81 in the image display device 80 includes a light source 81a, which emits light containing three color light fluxes, or red, green, and blue light fluxes, and a backlight guide 81b, which diffuses the light from the light source 81a into a light flux having a rectangular cross-sectional shape. The video image display device 82 is a video image device formed, for example, of a liquid crystal display device and spatially modulates the illumination light SL from the illuminator 81 to form image light to be displayed, such as motion images. The drive controller 84 includes a light source drive circuit 84a and a liquid crystal drive circuit 84b. The light source drive circuit 84a supplies the light source 81a in the illuminator 81 with electric power to allow the light source 81a to emit the illumination light SL having stable luminance. The liquid crystal drive circuit 84b outputs an image signal or a drive signal to the video image display device (video image device) 82 to cause it to form color video image light or color image light in the form of a transmittance pattern based on which motion images or still images are formed. An image processing capability can be added to the liquid crystal drive circuit 84b, or an external control circuit with an image processing capability can be used.

The optical path of the video image light GL and other light in the virtual image display apparatus 100 will be described below. The video image light GL outputted from the video image display device (video image device) 82 converges through the projection lens 30 and impinges on the sixth surface S16, which is a surface of the prism 10 and has relatively large positive power.

The video image light GL having passed through the sixth surface S16 of the prism 10 travels while converging and passes through the second prism portion 12, where the video image light GL is reflected off the fifth surface S15, which has relatively small positive power, and then reflected off the fourth surface S14, which has relatively small negative power.

The video image light GL reflected off the fourth surface S14 of the second prism portion 12 enters the first prism portion 11, where the video image light GL is incident on and totally reflected off the third surface S13, which has relatively small positive power, and the video image light GL is then incident on and totally reflected off the first surface S11, which has relatively small negative power. It is noted that the video image light GL forms an intermediate image in the prism 10 before or after the video image light GL travels via the third surface S13. An image plane II of the intermediate image corresponds to an image plane OI of the video image display device 82.

The video image light GL totally reflected off the first surface S11 is incident on the second surface S12. The video image light GL incident on the half-silvered mirror layer 15, in particular, partially passes through the half-silvered mirror layer 15 and is partially reflected off the half-silvered mirror layer 15. The partially reflected video image light GL is then incident on the first surface S11 again and passes therethrough. The half-silvered mirror layer 15 acts as a component having relatively large positive power on the video image light GL to be reflected off the half-silvered mirror layer 15. The first surface S11 acts, on the other hand, as a component having negative power on the video image light GL passing through the first surface S11.

The video image light GL having passed through the first surface S11 forms a substantially parallelized light flux and impinges on the pupil of the viewer's eye EY. That is, the video image light GL in the form of a virtual image allows the viewer to observe the image formed on the video image display device (video image device) 82.

On the other hand, a portion of outside light HL that is incident on the prism 10 in an area next to the second surface S12 on the −X side passes through the third surface S13 and the first surface S11 of the first prism portion 11. In this process, the positive power and the negative power of the two surfaces cancel with each other and aberrations are corrected at the same time. That is, the viewer observes through the prism 10 an image that is formed by the outside light and is not greatly distorted. Similarly, a portion of the outside light HL that is incident on the prism 10 in an area next to the second surface S12 on the +X side, that is, a portion of the outside light HL that is incident on the light transmissive member 50, passes through the third transmissive surface S53 and the first transmissive surface S51 of the light transmissive member 50. In this process, the positive power and the negative power of the two surfaces cancel with each other and aberrations are corrected at the same time. That is, the viewer observes through the light transmissive member 50 an image that is formed by the outside light and is not greatly distorted. Further, a portion of the outside light HL that is incident on an overlapping portion where the light transmissive member 50 faces the second surface S12 of the prism 10 passes through the third transmissive surface S53 and the first surface S11. In this process, the positive power and the negative power of the two surfaces cancel with each other and aberrations are corrected at the same time. That is, the viewer observes through the light transmissive member 50 an image that is formed by the outside light and is not greatly distorted. The second surface S12 of the prism 10 and the second transmissive surface S52 of the light transmissive member 50 have substantially the same curved shape and substantially the same refractive index, and the gap between the two surfaces is filled with the adhesive layer CC having a refractive index substantially equal to those of the prism 10 and the light transmissive member 50. That is, neither the second surface S12 of the prism 10 nor the second transmissive surface S52 of the light transmissive member 50 acts as a refraction surface on the outside light HL.

However, since the outside light HL incident on the half-silvered mirror layer 15 partially passes through the half-silvered mirror layer 15 and is partially reflected off the half-silvered mirror layer 15 at the same time, the outside light HL oriented in the direction corresponding to the half-silvered mirror layer 15 toward the eye EY is attenuated in accordance with the transmittance of the half-silvered mirror layer 15. On the other hand, since the video image light GL traveling in the direction corresponding to the half-silvered mirror layer 15 toward the eye EY is incident on the eye EY, the viewer observes an image formed by the outside light as well as the image formed on the video image display device (video image device) 82 in the direction of the half-silvered mirror layer 15.

The video image light GL having traveled through the prism 10 and impinged on the second surface S12 but not having been reflected off the half-silvered mirror layer 15 enters the light transmissive member 50, but an antireflection portion (not shown) provided in the light transmissive member 50 prevents the incident video image light from returning into the prism 10. That is, the video image light GL having passed through the second surface S12 is not allowed to return back to the optical path or form stray light. Further, the outside light HL incident through the light transmissive member 50 and reflected off the half-silvered mirror layer 15 returns into the light transmissive member 50, but the antireflection portion (not shown) provided in the light transmissive member 50 described above prevents the outside light from entering the prism 10. That is, the outside light HL reflected off the half-silvered mirror layer 15 is not allowed to return back to the optical path or form stray light.

As clearly described above, according to the virtual image display apparatus 100 of the first embodiment, since the optical members 101a and 101b or the light guide sections 20 are directly fixed to the frame 102 via the attachment portions 10g, which are portions in the periphery of the optical members 101a and 101b or the light guide sections 20, not only can the light guide sections 20 be readily fixed and the weight of the virtual image display apparatus 100 can be readily reduced but also the strength at which the frame 102 supports the light guide sections 20 is improved. Further, except the attachment portions 10g, the remaining peripheral portions A0 of the optical members 101a and 101b or the light guide sections 20 are not fixed to the frame 102 or the protector 108. Therefore, when the light guide sections 20, the frame 102, and other portions differ from each other in terms of the coefficient of thermal expansion, the light guide sections 20 are allowed to expand with respect to the frame 102 and the other portions, whereby no distortion, deformation, or breakage of the optical members 101a and 101b or the light guide sections 20 will occur.

Further, according to the virtual image display apparatus 100 of the present embodiment, the protector 108 covers and protects part of the peripheries of the optical members 101a and 101b or the light guide sections 20, specifically, except the attachment portions 10g fixed to the frame 102, the protector 108 covers and protects at least part of the remaining peripheral portions A0. That is, the frame 102 and the protector 108 can cover and protect the optical members 101a and 101b or the light guide sections 20 by surrounding the peripheries thereof, whereby the virtual image display apparatus 100 has improved durability against a strong impact produced, for example, when the virtual image display apparatus 100 accidentally falls and acting in an arbitrary direction.

Second Embodiment

A virtual image display apparatus according to a second embodiment will be described below. The virtual image display apparatus according to the present embodiment is a variation of the virtual image display apparatus 100 according to the first embodiment and is the same as the virtual image display apparatus 100 shown in FIG. 1 and other figures unless otherwise specified.

Figure 9A:
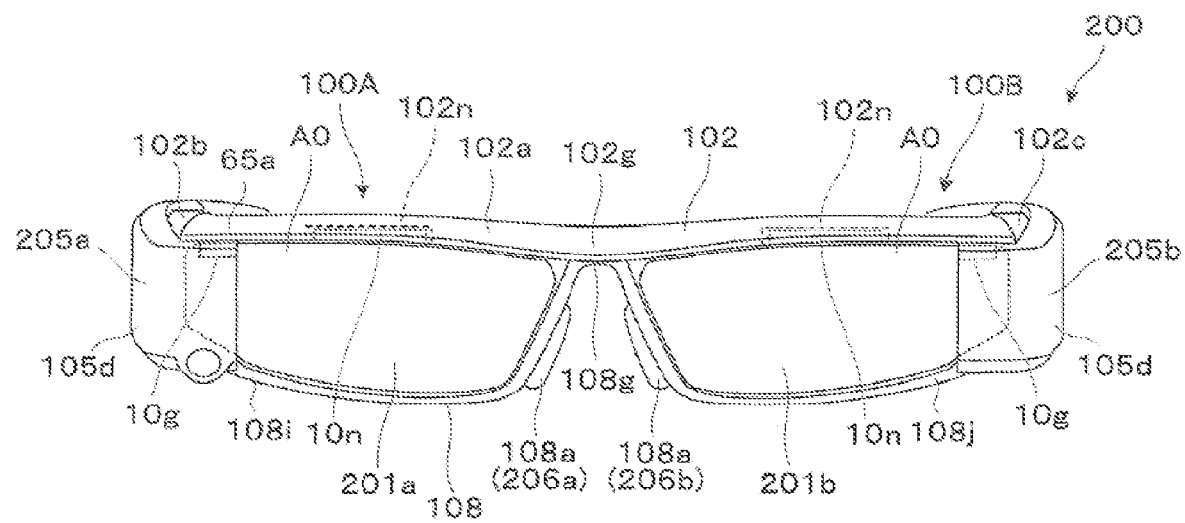
FIG. 9A is a front view for describing a virtual image display apparatus according to a second embodiment of the invention.
Figure 9B:
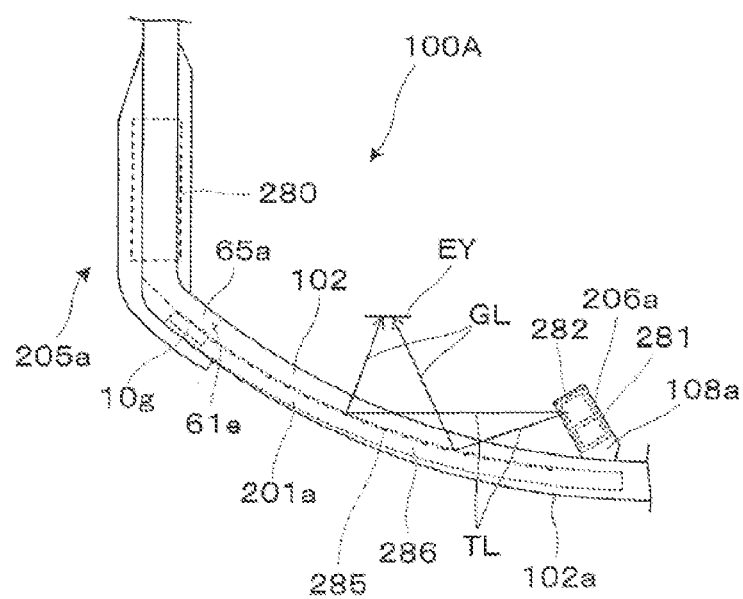
FIG. 9B is a plan view for describing the structure of a first display unit of the virtual image display apparatus.

A virtual image display apparatus 200 according to the present embodiment will be described below with reference to FIGS. 9A and 9B. The virtual image display apparatus 200 according to the present embodiment includes first and second optical members 201a, 201b, which cover areas in front of the viewer's eyes in such a way that the optical members allow see-through observation, a frame 102, which supports the optical members 201a and 201b, first and second drivers 205a, 205b, which are fixed to portions extending rearward from the right and left ends of the frame 102, and first and second video image devices 206a, 206b, each of which outputs signal light with which a target object is two-dimensionally scanned. A first display unit 100A, which is a combination of the first optical member 201a, the first driver 205a, and the first video image device 206a on the left side in FIG. 9A, is a portion that forms a virtual image for the right eye and functions by itself as a virtual image display apparatus. Similarly, a second display unit 100B, which is a combination of the second optical member 201b, the second driver 205b, and the second video image device 206b on the right side in FIG. 9A, is a portion that forms a virtual image for the left eye and has the same function as that of the first display unit 100A because the second display unit 100B is simply a horizontally reversed version of the first display unit 100A.

In the first display unit 100A, the first video image device 206a forms signal light modulated in terms of intensity and outputs the signal light in the form of scan light TL. The first optical member 201*a* is a member irradiated with the scan light TL from the first video image device 206*a* and reflecting the scan light TL to form image light GL and has a function of guiding the image light GL to an eye EY. The first driver 205*a* includes a main body portion 280 including a light source that supplies the first video image device 206*a* with illumination light, for example, via an optical fiber (not shown) and a control circuit or any other component that operates the first video image device 206*a*.

The first video image device 206*a* is assembled to a nose pad member 108*a* and hence indirectly fixed to the frame 102. The first video image device 206*a* includes a signal light modulator 281, which modulates the illumination light from the main body portion 280 based on a control signal, and a scan system 282, which outputs the signal light outputted from the signal light modulator 281 and scans a target object with the signal light. The scan system 282 is formed, for example, of a MEMS mirror that changes its attitude in synchronization with the signal light modulation performed by the signal light modulator 281 to adjust the optical path of the signal light so as to perform two-dimensional scan in which the exit angle of the light beam (scan light TL) directed toward the inner surface of the first optical member 201*a* is changed in the horizontal and vertical directions.

The first optical member 201*a* is disposed in a position in front of the first video image device 206*a* or in a position along the light exiting direction thereof in such away that the first optical member 201*a* covers an area in front of the wearer's eye EY. The first optical member 201*a* includes a semi-transmissive/semi-reflective film 285, which is a semi-transparent film irradiated with the scan light, and a support 286, which supports and fixes the semi-transparent/semi-reflective film 285. The thus configured first optical member 201*a* allows not only a virtual image formed by the image light GL but also light from the outside to be incident on the wearer's eye EY. The virtual image display apparatus 200 thus has a see-through configuration in which the two types of light are superimposed on each other for observation. The semi-transparent/semi-reflective film 285 can be a half-silvered mirror or a hologram or any other refractive optical element.

The first optical member 201*a* is not an internal-propagation-type light guide section unlike the first optical member 101*a* in the first embodiment but has a thin elliptical shape that covers an area in front of an eye and includes the attachment portion 10*g* and the rib 10*n* in the peripheral portion A0, which is part of the outer circumference of the first optical member 201*a*, as in the first embodiment.

A description will be made of the assembly of the first optical member 201*a* to the frame 102. The first optical member 201*a* is directly fixed to the second fixing portion 61*e* provided at the sideways end portion 65*a* located at a sideways portion of the frame 102 by using the protruding attachment portion 10*g* formed on the peripheral portion A0. The first optical member 201*a* is thus aligned with the first video image device 206*a* and other components. The groove-shaped limiting portion 102*n* is provided as a stopper in the frame 102. When the first optical member 201*a* is assembled, the protruding rib 10*n* provided on the upper end of the first optical member 201*a* is inserted and fit into the limiting portion 102*n* with a play or a slight gap between the rib 10*n* and the limiting portion 102*n*, whereby displacement of the upper end of the first optical member 201*a* can be limited in the depth direction of the frame 102. The portion of the first optical member 201*a* except the attachment portion 10*g* is slightly separate from the frame 102 and the protector 108 and is not fixed to the frame 102 or the protector 108.

The image formation operation will be described below. First, the signal light modulator 281 in the first video image device 206*a* forms and outputs signal light produced by modulating the illumination light in accordance with the luminance of each pixel that forms an image. The signal light outputted from the signal light modulator 281 is incident on the scan system 282, which is a scanner. The scan system 282 outputs the signal light in the form of the scan light TL toward the first optical member 201*a*. The first optical member 201*a*, on which the scan light TL is incident, forms a virtual image based on the image light GL reflected off the first optical member 201*a*, and the viewer captures the virtual image with the eye EY and recognizes the image.

The invention has been described with reference to the above embodiments, but the invention is not limited thereto. The invention can be implemented in a variety of other aspects to the extent that they do not depart from the substance of the invention. For example, the following variations are conceivable.

In the first embodiment described above, the frame 102 and the projection lens 30 are separate from each other, and the projection lens 30 is fixed to the frame 102 with a screw. The lens barrel 39 of the projection lens 30 may instead be formed integrally with the frame 102. An example of a method for forming the lens barrel 39 integrally with the frame 102 includes machining a lens barrel after outsert molding or die-cast integral molding.

The light guide section 20 or the projection lens 30 is not necessarily connected to the frame 102 with screws but can be fixed to the frame 102 based on a variety of other methods.

In the above description, the protector 108 is attached to the frame 102, but the protector 108 can be omitted. In this case, the shape of the frame 102 shown in FIG. 2B and other figures may remain as it is, and an auxiliary member provided with the nose pad members 108*a* can be connected to the central portion 102*g* of the frame 102, or the frame 102 integrally provided with the auxiliary member can be provided in advance. The auxiliary member can be used as a member that protects the light guide sections 20 as the vertical portions 63*a* of the protector 108 can. Alternatively, the frame 102 and the protector 108 can be formed integrally with each other.

In the above description, the light guide section 20, which is the first optical member 201*a*, and other components are supported as a cantilever fixed to the frame 102. The light guide section 20 and other components can instead be so supported that the entire periphery thereof is supported by the frame 102 and the protector 108. In this case, each of the frame 102 and the protector 108 is desirably provided with a member or a mechanism that allows relative expansion and shrinkage of the light guide section 20.

In the first embodiment described above, the projection lens 30 is disposed on the light incident side of the prism 10. Instead, the projection lens 30 can be omitted, and an image formation capability can be added to the prism 10 itself, or the projection lens 30 can be replaced with another prism 10 having an image formation capability.

In the above description, the frame 102 is provided with the limiting portion 102*n*. In place thereof or in addition thereto, the protector 108 can be provided with a similar limiting portion for preventing deformation, shaking, and other disadvantageous phenomena of the prism 10.

In the first embodiment described above, the lens barrel 39 of the projection lens 30 is provided with the engaging member 39*a*, which can engage with the light guide section 20. The light guide section 20 can instead be provided with an engaging member that, for example, fits into the lens barrel 39 in such a way that the engaging member sandwiches the lens barrel 39.

In the first embodiment described above, the half-silvered mirror layer (semi-transmissive/semi-reflective film) 15 is formed in a laterally elongated rectangular area. The contour of the half-silvered mirror layer 15 can be changed as appropriate in accordance with an application of interest and other usages. Further, the transmittance and reflectance of the half-silvered mirror layer 15 can be changed in accordance with an application of interest and other factors.

In the first embodiment described above, the half-silvered mirror layer 15 is a simple semi-transmissive film (metal reflection film or dielectric multilayer film, for example), and the half-silvered mirror layer 15 can be replaced with a flat-surface or curved-surface hologram element.

In the first embodiment described above, the luminance distribution of an image displayed on the video image display device 82 is not particularly adjusted. When the luminance varies position to position, for example, the luminance distribution of a displayed image can be nonuniformly adjusted.

In the first embodiment described above, the image display device 80 includes the video image display device 82 formed, for example, of a transmissive liquid crystal display device. The image display device 80 does not necessarily include the video image display device 82 formed, for example, of a transmissive liquid crystal display device and can instead be any other device. For example, the image display device 80 can include a reflective liquid crystal display device, or the video image display device 82 formed, for example, of a liquid crystal display device can be replaced, for example, with a digital micromirror device. Further, the image display device 80 can include a self-luminous device, representative examples of which include an LED array and an GELD (organic EL display).

In the first embodiment described above, the image display device 80 formed, for example, of a transmissive liquid crystal display device is used. The image display device 80 can be replaced with a scan-type image display device.

Figure 10:
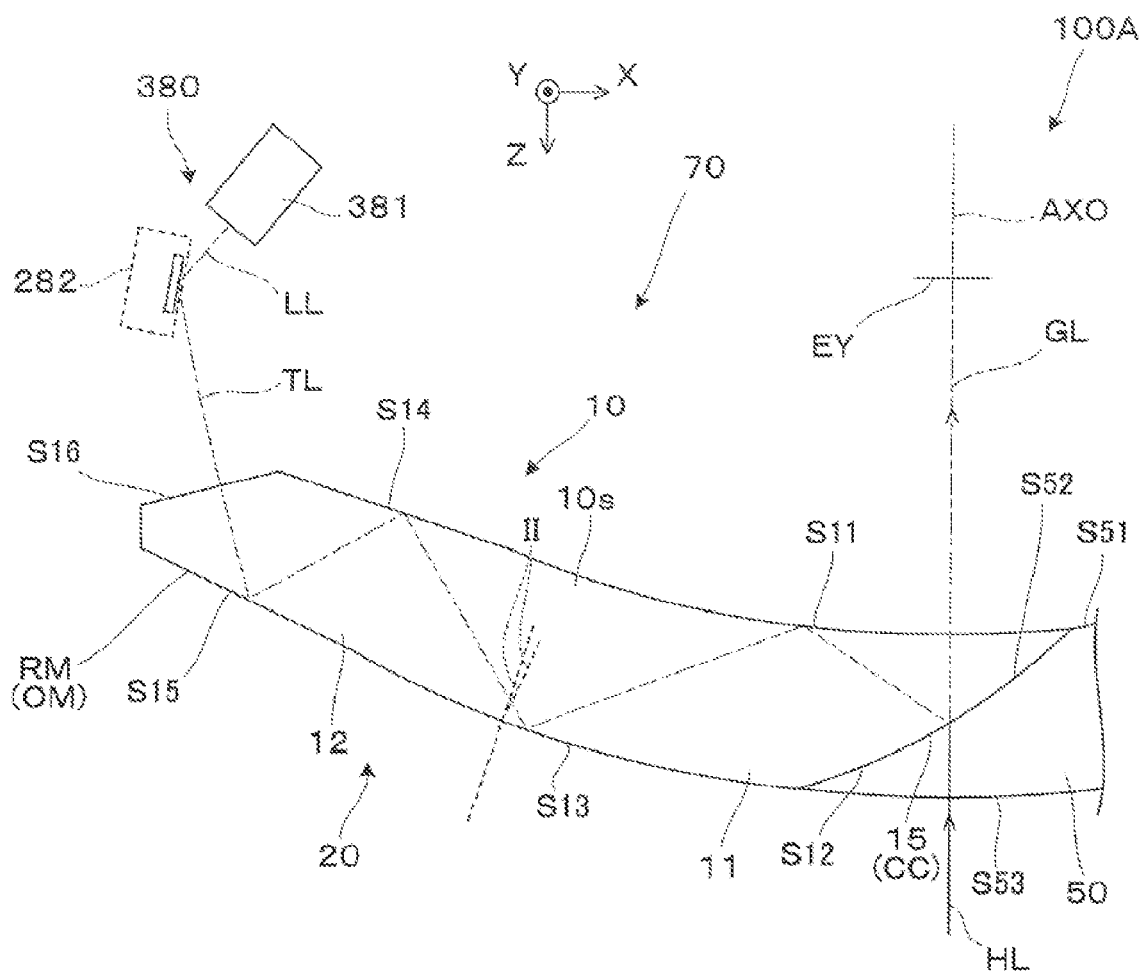
FIG. 10 describes a virtual image display apparatus according to a variation.

Specifically, the first display unit 100A as a virtual image display apparatus includes the light guide section 20 and an image display device 380, as shown in FIG. 10. The light guide section 20 is the same as that described in the first embodiment and no description thereof will therefore be made. On the other hand, the image display device 380 corresponds to the first video image device 206a in the second embodiment and includes a signal light formation portion 381 and the scan system 282. The signal light formation portion 381 also includes a light source and forms and outputs signal light LL. The scan system 282 changes the attitude of a MEMS mirror in synchronization with modulation performed by the signal light formation portion 381 to adjust the optical path of the signal light so as to cause the scan light TL, which will form video image light GL, to be incident on the light guide section 20 and an entire partial area of the second surface S12 where the half-silvered mirror layer 15 is formed to be scanned with the scan light TL. A description will be made of the operation of the first display unit 100A shown in FIG. 10. In the image display device 380, the signal light LL outputted from the signal light formation portion 381 is incident on the scan system 282. The scan system 282 outputs the signal light LL in the form of the scan light TL toward the sixth surface S16 of the light guide section 20. The light guide section 20 guides the scan light TL having passed through the sixth surface S16 through the light guide section 20 based, for example, on total reflection and causes the scan light TL to reach the half-silvered mirror layer 15. In this process, when the half-silvered mirror layer 15 is scanned with the scan light TL, a virtual image is formed by the image light GL in the form of the trajectory of the scan light TL, and the wearer's eye EY captures the virtual image for image recognition. In FIG. 10, the sixth surface S16 or a light incident surface of the light guide section 20 is a flat surface perpendicular to the optical axis of the scan light TL. Further, each of the fifth surface S15 and the fourth surface S14 is a flat surface.

The above description has been made of the virtual image display apparatus 100 including a pair of display units 100A and 100B, and the pair of display units 100A and 100B can be replaced with a single display unit. That is, instead of providing each of the right and left eyes with a set of the projection and see-through device 70 and the image display device 80, only one of the right and left eyes may be provided with the projection and see-through device 70 and the image display device 80 for monocular image observation. In this case, the frame 102 and the sidepiece portions 104 can be so shaped that they remain horizontally symmetric as shown, for example, in FIG. 1, or a frame portion that supports no display unit can be so shaped differently that the frame portion is fixed to a face portion other than the ear.

In the above description, the distance between the pair of display units 100A and 100B in the X direction has not been described. The distance between the display units 100A and 100B is not necessarily fixed and can be adjusted, for example, by using a mechanical mechanism. That is, when the frame 102 is provided, for example, with an expansion/contraction mechanism, the distance between the display units 100A and 100B in the X direction can be adjusted in accordance with the interpupillary distance of the wearer and other factors.

In the first embodiment described above, each of the first surface S11 and the third surface S13 of the prism 10 does not have a mirror, a half-silvered mirror, or any other optical component formed thereon but the interface between the surface and air totally reflects and guides video image light. The total reflection in the virtual image display apparatus 100 according to the embodiment of the invention also includes reflection based on a mirror coating or a half-silvered mirror film formed on the entirety or part of the first surface S11 or the third surface S13. For example, the total reflection in the embodiment of the invention includes a case where substantially the entire video image light is reflected off a mirror coating or any other optical component provided on the entirety or part of the first surface S11 or the third surface S13 described above provided that the angle of incident of the video image light satisfies the total reflection condition. Further, the entirety or part of the first surface S11 or the third surface S13 may be coated with a mirror having a certain small degree of transmittance provided that sufficiently bright video image light is supplied.

In the above description, the prism 10 and other components extend in the horizontal direction along which the eyes EY are arranged. The prism 10 can alternatively be so disposed that it extends in the vertical direction. In this case, the prism 10 is, for example, supported as a cantilever with an upper portion thereof fixed.

The entire disclosure of Japanese Patent Application No. 2012-243336, filed Nov. 5, 2012 is expressly incorporated by reference herein.

What is claimed is:
1. A virtual image display apparatus that allows a viewer to visually recognize video images in the form of virtual images, the apparatus comprising:
   a video image device;

an optical member that directs light from the video image device toward a viewer's eye to allow the viewer to visually recognize an image; and a frame that supports the video image device and the optical member in such a way that the optical member is disposed in front of the viewer's eye, the frame including a front portion that extends in a lateral direction in front of the viewer, wherein:
the optical member is directly fixed to the frame via an attachment portion that is part of a peripheral light-incident-side portion of the optical member, and a peripheral portion of the optical member other than the attachment portion at the peripheral light-incident-side portion is not fixed to the frame, and the frame has a groove-shaped limiting portion and the optical member has a protruding portion disposed within the groove-shaped limiting portion so as to limit displacement of the optical member in a depth direction of the frame and allow displacement of the optical member in the lateral direction.

2. The virtual image display apparatus according to claim 1,
wherein the optical member reflects video images from the video image device and guides the video images to the viewer's eye.

3. The virtual image display apparatus according to claim 2,
wherein the optical member has a prism-shaped light guide section that guides video image light from a video image display device that is the video image device to the viewer's eye while internally reflecting the video image light.

4. The virtual image display apparatus according to claim 3,
wherein the attachment portion is disposed at a light-incident-side portion of the light guide section.

5. The virtual image display apparatus according to claim 4,
wherein the attachment portion is fixed to a sideways portion of the frame.

6. The virtual image display apparatus according to claim 3,
wherein the frame has a first fixing portion that fixes an image formation main body portion including the video image display device and a second fixing portion that fixes the light guide section.

7. The virtual image display apparatus according to claim 6,
wherein the image formation main body portion is fixed to the first fixing portion with a screw, and the light guide section is fixed to the second fixing portion with a screw.

8. The virtual image display apparatus according to claim 6,
wherein the image formation main body portion has an engaging member that engages with the light guide section when the engaging member comes into contact with the light guide section.

9. The virtual image display apparatus according to claim 8,
wherein the image formation main body portion includes a projection lens that focuses the video image light from the video image display device in the light guide section.

10. The virtual image display apparatus according to claim 3,
wherein the image formation main body portion includes a cover-shaped exterior member fixed to the frame.

11. The virtual image display apparatus according to claim 3,
wherein the light guide section includes a prism that guides the video image light and allows see-through observation of outside light and a light transmissive member that is connected to the prism and assists the outside light see-through observation capability of the prism.

12. The virtual image display apparatus according to claim 2,
wherein the video image device outputs signal light which forms two-dimensional scan light, and the optical member reflects the light from the video image display device and guides the light to the viewer's eye.

13. The virtual image display apparatus according to claim 1, further comprising
a protector that is fixed to the frame and protects at least part of the peripheral portion of the optical member except the attachment portion.

14. The virtual image display apparatus according to claim 13,
wherein each of the frame and the protector is formed of a metal material.

15. The virtual image display apparatus according to claim 1,
wherein the frame fixes and supports a pair of video image devices and a pair of optical members symmetrically in the sideways direction.

16. A virtual image display apparatus that allows a viewer to visually recognize video images in the form of virtual images, the apparatus comprising:
a video image device;
an optical member that directs light from the video image device toward a viewer's eye to allow the viewer to visually recognize an image;
a frame that supports the video image device and the optical member in such a way that the optical member is disposed in front of the viewer's eye, the frame including a front portion that extends in a lateral direction in front of the viewer; and
a protector that is fixed to the frame and covers and protects at least part of a peripheral portion of the optical member except an attachment portion fixed to the frame, wherein:
the frame has a groove-shaped limiting portion and the optical member has a protruding portion disposed within the groove-shaped limiting portion so as to limit displacement of the optical member in a depth direction of the frame and allow displacement of the optical member in the lateral direction.

17. The virtual image display apparatus according to claim 16,
wherein the optical member has a prism-shaped light guide section that guides video image light from a video image display device that is the video image device to the viewer's eye while internally reflecting the video image light.

18. The virtual image display apparatus according to claim 16,
wherein the optical member is not fixed to the protector.

19. The virtual image display apparatus according to claim 16,
wherein the protector is a frame-shaped, elongated member.

20. The virtual image display apparatus according to claim 16,
wherein the protector is directly or indirectly fixed to a central portion and sideways portions of the frame.

21. The virtual image display apparatus according to claim 1, wherein an opening is defined in the attachment portion at the peripheral light-incident-side portion of the optical member.

22. The virtual image display apparatus according to claim 1, wherein the groove-shaped limiting portion is provided in the front portion of the frame.

23. The virtual image display apparatus according to claim 1, wherein the protruding portion of the optical member is a rib that extends laterally within the groove-shaped limiting portion.

* * * * *